(12) United States Patent
Fricker et al.

(10) Patent No.: US 9,580,862 B2
(45) Date of Patent: Feb. 28, 2017

(54) DEVICE AND METHOD FOR TREATING (SOFTENING) CONTINUOUSLY CONVEYED MATERIAL

(75) Inventors: Paul Fricker, Wohlen (CH); Andreas Hiss, Zell i.W (DE); Klaus Dieter Traut, Hausen (DE)

(73) Assignee: Benninger Zell GmbH, Zell i.W. (DE)

( * ) Notice: Subject to any disclaimer, the term of this patent is extended or adjusted under 35 U.S.C. 154(b) by 945 days.

(21) Appl. No.: 13/819,329

(22) PCT Filed: Aug. 24, 2011

(86) PCT No.: PCT/EP2011/064500
§ 371 (c)(1),
(2), (4) Date: Apr. 16, 2013

(87) PCT Pub. No.: WO2012/028497
PCT Pub. Date: Mar. 8, 2012

(65) Prior Publication Data
US 2013/0207308 A1    Aug. 15, 2013

(30) Foreign Application Priority Data
Sep. 1, 2010    (EP) .................................... 10174942

(51) Int. Cl.
*D06M 10/00*    (2006.01)
*B29C 55/18*    (2006.01)
(Continued)

(52) U.S. Cl.
CPC ............. *D06M 10/00* (2013.01); *B29C 55/18* (2013.01); *D06C 19/00* (2013.01); *B29C 51/225* (2013.01)

(58) Field of Classification Search
CPC ...... D06M 10/00; B29C 55/18; B29C 51/225; D06C 19/00
(Continued)

(56) References Cited

U.S. PATENT DOCUMENTS 2,988,989 A *  6/1961  Crawford .................. B41F 9/01
                                                    101/152
3,600,918 A *  8/1971  Lemelson ............. B29C 43/222
                                                    264/132
(Continued)

FOREIGN PATENT DOCUMENTS

DE        716279       12/1941
EP       0149844        7/1985
(Continued)

OTHER PUBLICATIONS

Japanese Office Action issued in corresponding Japanese Patent Application No. 2013-526406 mailed Sep. 29, 2015.

*Primary Examiner* — Nahida Sultana
(74) *Attorney, Agent, or Firm* — Davis & Bujold PLLC; Michael J. Bujold

(57) ABSTRACT

A device for treating a continuously conveyed thread group in order to produce tire cord has a roller pair for locally softening the thread group, wherein each roller (3, 4) is provided with a toothing formation. When the thread group is guided through between the rollers (3, 4), it is deformed by the mechanical loading of the teeth. The rollers (3, 4) can be driven in a separate manner directly or indirectly by way of actuable electric motors, as a result of which the gap spacings (A) and (B) can be set precisely identically. The axle spacing (C) of the two rollers (3, 4) can be set depending on the fabric thickness and the fabric type.

15 Claims, 4 Drawing Sheets

Figure 1:
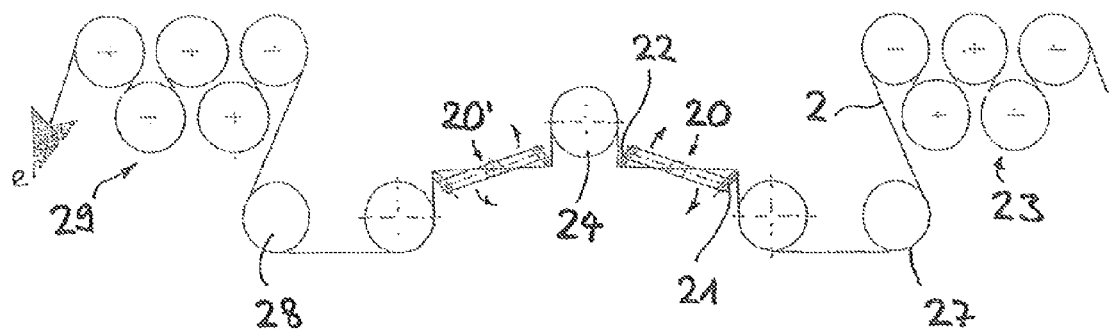

(51) Int. Cl.
*D06C 19/00* (2006.01)
*B29C 51/22* (2006.01)

(58) Field of Classification Search
USPC ....... 425/149, 150, 135, 162, 363, 367, 193; 264/280, 284, 286, 294
See application file for complete search history.

(56) References Cited

U.S. PATENT DOCUMENTS

| | | | |
|---|---|---|---|
| 3,863,480 A * | 2/1975 | Meserole | B21C 37/124 72/50 |
| 4,223,063 A | 9/1980 | Sabee | |
| 4,741,192 A * | 5/1988 | Wallis | B21D 13/04 242/559.2 |
| 4,798,529 A * | 1/1989 | Klinner | B30B 11/027 100/155 R |
| 5,098,335 A * | 3/1992 | Ellis | A22C 21/0092 452/111 |
| 5,162,119 A * | 11/1992 | Pappas | A21C 9/04 101/106 |
| 5,455,992 A | 10/1995 | Kurschatke et al. | |
| 6,250,904 B1 * | 6/2001 | Reddy | B29C 43/245 425/135 |
| 7,165,959 B2 * | 1/2007 | Humlicek | B29C 59/046 264/284 |
| 9,004,899 B2 * | 4/2015 | Nagayama | B26D 1/255 425/235 |
| 2005/0116374 A1 * | 6/2005 | Ogawa | B29C 47/92 264/103 |
| 2006/0131783 A1 | 6/2006 | Morman et al. | |

FOREIGN PATENT DOCUMENTS

| | | |
|---|---|---|
| EP | 0411857 | 2/1991 |
| EP | 1956131 | 8/2008 |
| GB | 249733 | 4/1926 |
| GB | 792570 | 3/1958 |
| JP | S6399339 | 4/1988 |
| JP | 2007315901 | 12/2007 |
| JP | 2008-072131 | 10/2009 |
| WO | 00/29199 | 5/2000 |
| WO | 00/69622 | 11/2000 |

* cited by examiner

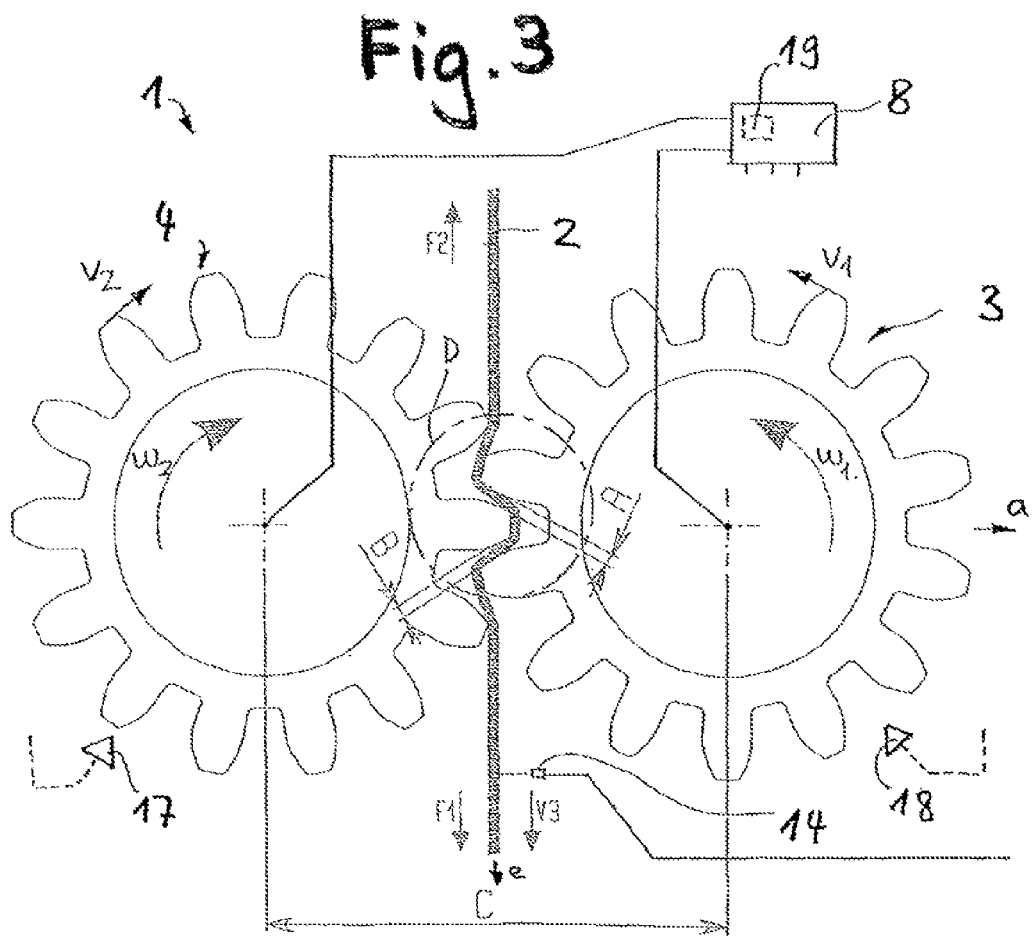
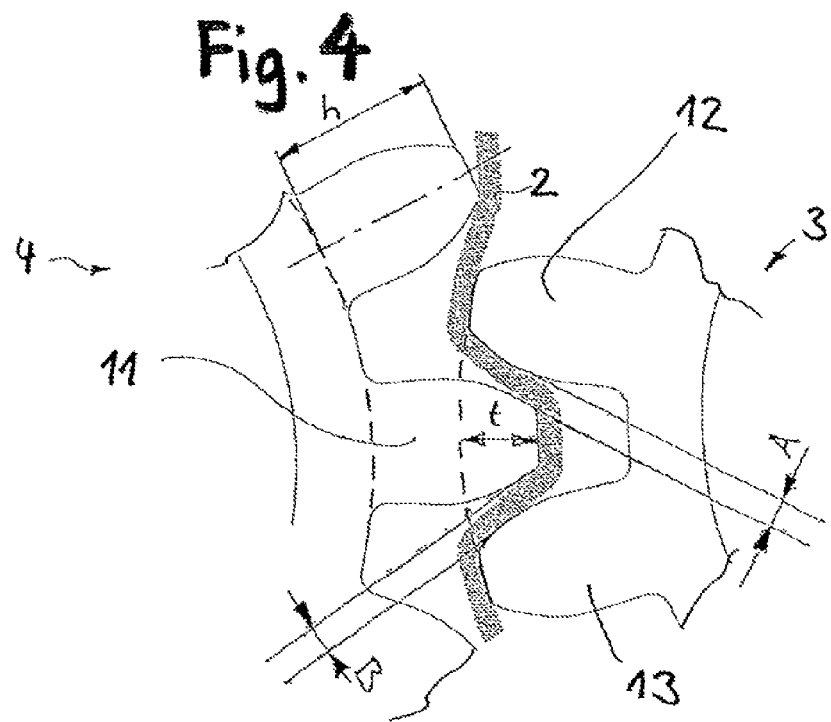

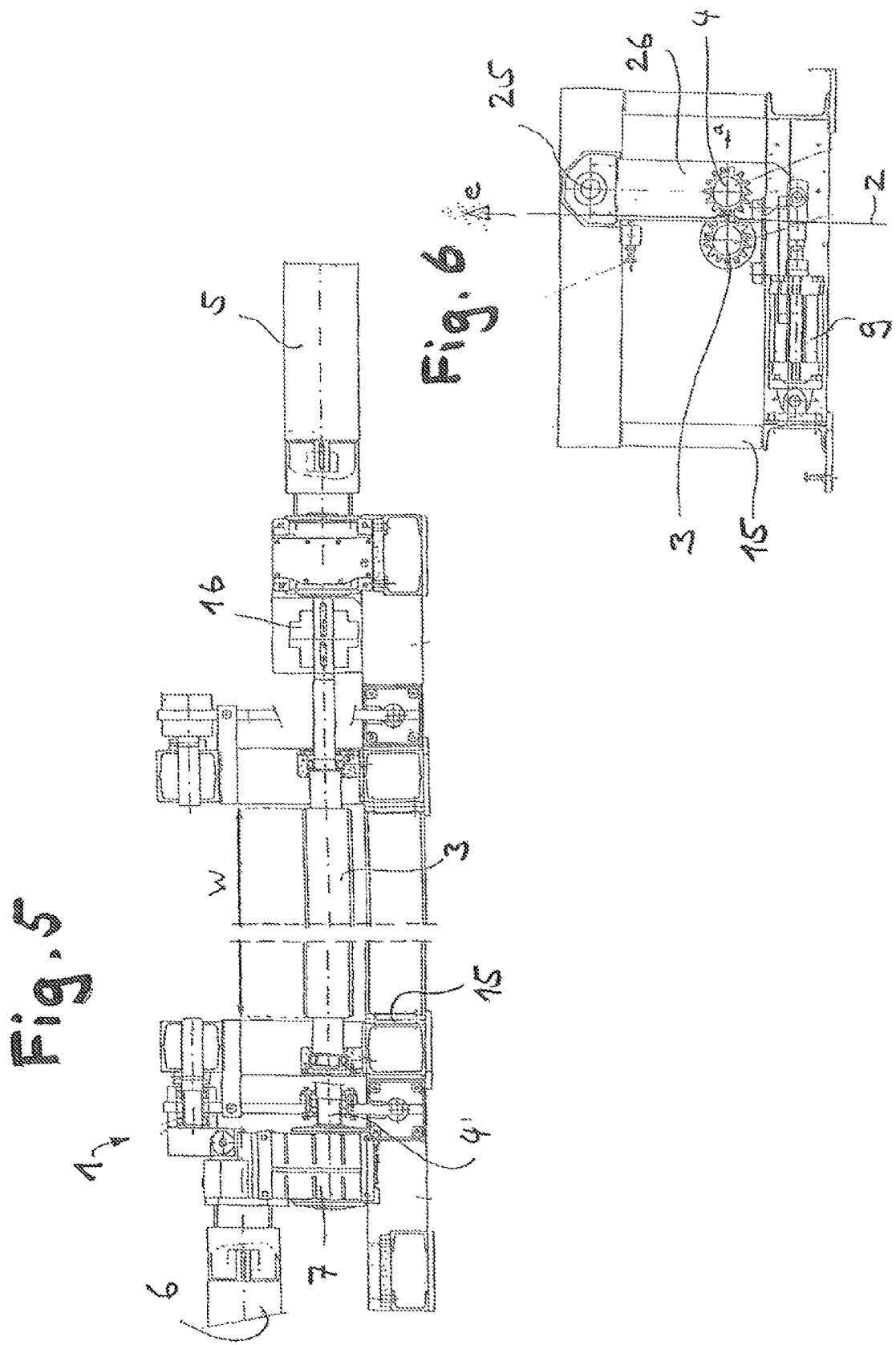

DEVICE AND METHOD FOR TREATING (SOFTENING) CONTINUOUSLY CONVEYED MATERIAL

The invention relates to a device and a method for treating continuously conveyed material. The material may be a sheet-like structure, for example a textile cloth web. The device according to the invention is especially suitable for treating a warp of tire cord. In the production of tire cord, the fabric impregnated with an adhesion promoter is led through a dryer. Particularly when fabrics or threads composed of polyester are used, impregnation and heat treatment lead to an undesirable stiffening of material. It is known to deform and soften the material by means of deflections in order to restore the flexible material properties.

Units for the local deformation of synthetic fibers or fabrics for the production of tire cord are known, in which the material is led past a knife edge running transversely to the material direction and is bent locally as a result of this stripping action. A deforming unit of this type became known, for example, from the applicant (Benninger Zell GmbH) under the type designation "Softener Paraflex" and is shown in the following FIG. 1. One disadvantage of this device is that the knife edge may damage the material and, in particular, the impregnating film applied to the synthetic threads. It was then shown, in practice, that excess material scraped off by the knife edges from the impregnation may remain adherent to plant parts after passing through the deforming unit and is then entrained by following material (fibrils of the threads), thus resulting in irregularities in the impregnation on the threads. A further problem arises from the fact that the bending elements are heated due to friction and therefore have to be cooled at comparatively high outlay, and that an electrostatic charge builds up as a result of friction.

A device became known from GB 792 570, in which individual threads or yarns are led through a pair of rollers with the aim of increasing the tension. The rollers have toothings with pointed teeth. By the action of the teeth, the thread is deformed and thus drafted mechanically. One of the splined shafts can be braked via a magnetic brake, with the result that the other splined shaft operatively connected thereto is braked automatically. Tests have shown that the device is somewhat unsuitable in special areas of application, such as, for example, for the softening of thread cord. The arrangement has the disadvantage, inter alia, that the deformation process is difficult to control. In particular, because gap widths between the toothed rollers are too small, undesirable stress peaks and pinching of the thread can scarcely be prevented. This would then result in damage to the impregnation or even in thread or fibril breaks. A further disadvantage is that only inadequate action can be taken on the thread tension. Furthermore, the arrangement is not suitable for treating a warp in which the threads have previously been impregnated with an adhesion promoter. In this arrangement, any excess material on the threads would cause faults.

An object of the present invention is, therefore, to avoid the disadvantages of what is known and, in particular, to provide a device and a method in which the material is treated carefully during deformation. Furthermore, the process conditions during deformation are to be accurately controllable and the end product should fulfill more stringent requirements particularly with regard to impregnating quality and degree of softening. Further, the device is to be capable of being operated efficiently in energy terms and manage as far as possible without cooling. In comparison with conventional devices operating with knife edges, abrasion on the threads and consequently the waste which occurs should be lower. Such abrasion has an adverse effect upon the rubber adhesion characteristics of the tire cord. Finally, the device is also to be suitable for installation in existing plants for the production of tire cord (what is known as "retrofit").

These objects are achieved, according to the invention, by means of a device and a method which have the features of the independent claims.

The device has one or more units for the local deformation of the material. The deforming unit is composed of a pair of rollers, each roller being provided in the region of the roller surface area with a profiling. The profiling may preferably be a toothing. The profiling or toothing may extend in the axial direction preferably over the entire roller width. When the material is led through between the rollers, the material is deformed in the transport direction by the mechanical action of the profiling or teeth and is consequently made flexible or softer. Such a pair of toothed rollers is distinguished, as compared with conventional deforming units which operate with the previously described knife edges, by a low space requirement. The rollers can be driven separately, as a result of which the parameters (in particular, the positions of the rollers, angular and tooth flank play A and B; cf. FIGS. 3 and 4) for the deformation of the material can be controlled accurately. The device treats the material carefully during deformation, with the result that a high-quality end product can be produced. pinching of the material, which is unfavorable in terms of product quality, can be prevented or at least greatly reduced by means of the device according to the invention. The device has further advantages with regard to energy efficiency, and, because of the small amount of heat generated, cooling is not necessary during the deformation process.

The device may have two, three or more deforming units arranged in succession with respect to the transport direction. The motor-drivable pairs of rollers with the toothings have the advantage that they can also perform the function of conveying or transport means. It is advantageous in this case if, in addition to the unit with the at least one pair of rollers, at least one traction mechanism is additionally used. However, theoretically, it would also be conceivable that additional rollers for a traction mechanism are not required for the purpose of maintaining fault-free conveyance. The last pair of rollers of a row of pairs of rollers could assume the function of a traction mechanism.

It may be advantageous if at least two deforming units with pairs of rollers are provided, the at least two pairs of rollers having in each case different toothings. There is also provision for mounting two or more appliances with a different tooth profile in succession. For example, the device may have a deforming unit with rollers having a coarse toothing (for example, 14 teeth) and subsequently a deforming unit with finer toothing (for example, 40 teeth), with the result that the softening effect/degree of softening can be further improved, depending on the type of fabric.

Furthermore, it may be advantageous if the device has at least one deforming unit with a pair of rollers and at least one deforming unit with a knife edge running transversely to the material direction, for example of the "Softener Paraflex" type. The "Softener Paraflex" appliance has the advantage that the knife edges can be adjusted into an operating position or an inactive position, as required. This variant constitutes as it were a universal solution and affords all optimizing possibilities for all types of fabric. Such a device may have, for example, a "Softener Paraflex" appliance, a deforming unit with rollers having 14 teeth and a deforming unit with a toothing of 40 teeth (advantageously in this order with respect to the material transport direction).

The rollers are arranged so as to engage one in the other in such a way that a gap is formed between the toothings preferably under the control of two separate digital drives. However, direct contact between the respective teeth of the rollers does not arise simply because of the presence of the material which is led through between the rollers.

A further operating parameter is the distance between the axes of rotation of the pair of rollers (center distance C). By the center distance being set, the degree of bending of the threads can be influenced, depending on the specification of the thread or fabric.

The rollers of a pair of rollers may have axes of rotation running axially parallel. During operation, the rollers rotate synchronously at the same rotational speed, but with an opposite direction of rotation. The profiling or toothing may extend in the axial direction along the surface area of a roller. In other words, the profiling or toothing runs transversely and preferably at right angles to the transport direction of the material. Owing to the small space requirement, the device is also suitable for installation in existing plants. In particular, conventional systems based, for example, on knife edges could be replaced simply and without high outlay (retrofit).

It may be advantageous if the transport path of the material, both on the entry side and on the exit side, runs approximately perpendicularly to the pair of rollers with respect to the plane formed by the two axes of rotation. Deflection directly in the region of the toothed rollers is therefore not desired in this case. The material may, for example, be led up to the deforming unit and away from the latter along a vertical transport path by means of corresponding guide and deflection means, preferably in the form of rollers or rolls. However, for specific areas of application, it would also be conceivable that the material is led at least partially along on the circumference of one of the profiled shafts on the entry side and/or on the exit side.

Each roller of the pair of rollers has a rotary drive. A rotary drive of this type may be preferably an electric motor, for example a brushless direct current motor or a single-phase, two-phase or three-phase AC motor. The rotary drive may preferably have a rotary encoder or pulse generator as an angle measurement system. In control and regulating terms, it may be especially advantageous if the rotary drive is designed as a servo drive (for example, an AC servomotor), in particular as a digital servo drive. The term "digital drive" is also used below for a digital servo drive with a rotary encoder or pulse generator as an angle measurement system. The gaps (A, B) between the rollers can thus be set and controlled exactly. To avoid the pinching of the threads, the gaps or distances A and B should be maintained exactly by means of corresponding control or regulation (target A=B).

The two rotary drives of the rollers are controllable separately by control means. With the aid of control means, the operating parameters, in particular the gaps A and B, and the rotational speeds can be optimized and/or varied in a simple way. In particular, by means of this arrangement, the exact position of the rollers and therefore the gaps between the rollers can be set constantly. Undesirable pinching of the material can thus be avoided and softening can be optimized, depending on the fabric thickness.

For specific intended uses, it may be advantageous if the rotary drives of the rollers are activated in such a way that the rotational speed of the rollers is higher than the material speed, with the result that, depending on the type of fabric, the softening effect can be optimized. The material speed may in this case be capable of being set via two traction mechanisms, in each case a traction mechanism preceding or following the rollers with respect to the deforming unit.

It may be advantageous, further, if the rotary drive is in each case connected to the roller directly or via a preferably pretensioned gear. This arrangement makes it possible that the two rollers can be driven in rotation synchronously, but in an opposite direction of rotation, at comparatively low outlay in terms of regulation and/or control.

The rotary drives are preferably connected to a central control apparatus via preferably serial interfaces.

Advantages in terms of control and regulation arise when the rotary drive has in each case an electric motor, the electric motor being controllable via a digital drive device. By means of digital drives of this type, angularly synchronous operation of the rollers of a pair of rollers can be maintained in an especially simple way. Digital drives are suitable, in particular, in the case of the direct connection between the rotary drive and toothed shaft and when the abovementioned pretensioned gear is used, in which gear play can be virtually ruled out.

The control means may be connected electronically to a rotary encoder, by means of which in each case a signal for the angular speed and instantaneous position of the rollers can be generated.

The electric motor preferably has an integrated rotary encoder, by means of which pulse-like signals can be generated. These signals can be evaluated by a controller of the control apparatus, from which the rotational speed, number of revolutions and rotary angle of the motor shaft of the rotary drive can be obtained.

Particularly when digital drives are used in combination with the direct shaft connection or with the pretensioned gear, what can be achieved is that there is no need for iterative acquisition of the rotational speed and rotary position and the regulation of the rollers. Direct action can be taken upon the rotational speed and rotary position of the rollers by the control apparatus. In the first variant described, the two rollers can be controlled via two control circuits.

Alternatively or possibly even additionally, however, it may also be advantageous if the control means have a controller for regulating the angular speeds and positions (angular positions) of the rollers (second variant). The regulation of the rotary drives of the rollers has the advantage that, for example, the varying nature of the material can be balanced optimally. The rotary drives may be assigned in each case to a separate control loop circuit.

Operational monitoring may be optimized by providing sensors for detecting the gap widths between the toothings of a pair of rollers. By means of the sensors, the gap widths which occur between the respective flank portions of the pair of toothed rollers can be measured directly or indirectly. In indirect measurement, the respective gap widths can be calculated by means of the angular positions of the two rollers, taking into account the roller and toothing geometry. The sensors cooperate electronically with control means in such a way that the gap widths can be equated to one another controlling of the rotary drives.

The device may comprise a sensor for detecting the speed of the material, which sensor may precede or follow the pair of rollers with respect to the transport direction. The sensor may in this case be connected electronically to control means for controlling the rollers. The speed sensor may preferably be a contactless optical sensor, in particular a laser sensor. By means of the device, a lead or a lag of the material can be set in a simple way, as required.

The device may have an adjustment apparatus, by means of which the distance between the axes of rotation of the rollers can be set.

The adjustment apparatus may have hydraulic or pneumatic displacement means for shortening or lengthening the distance which is predetermined by the axes of rotation of the rollers. By this distance being shortened, the effect of local deformation can be increased. The displacement means may be formed, for example, by a pneumatic or hydraulic piston/cylinder unit. Instead of the displacement means mentioned, alternatively, a linear drive operable, for example, via a stepping motor may also be envisaged. The use of pneumatic or hydraulic piston/cylinder units has the advantage, inter alia, that the gap between the toothings can be widened in the event of thread thickenings or splices (connection point of the warp).

One roller of the pair of rollers may be mounted fixedly with respect to its axis of rotation on a stationary carrier of the device. The other roller of the pair of rollers may be mounted movably on the stationary carrier for shortening or lengthening the distance. It is, of course, theoretically also possible, however, to configure both rollers so as to be movable.

The deformation of the warp can be influenced especially simply in that the displacement devices or means can be controlled via control means for the purpose of varying the wrap angle.

The rollers may be in the form of a spur wheel with straight toothing or helical toothing.

The rollers may have an involute or cycloidal toothing. However, other toothing geometries are, of course, also conceivable. For example, the toothing may have a radius on the tooth tip in the region of the tip circle and/or in the region of the root. Possible versions may have, for example, 14 or 40 teeth (that is to say, $z=14$ or 40). However, other z numbers may, of course, also be envisaged. Depending on the type of material, in a specific device, rollers with a different number of teeth, modulus and tooth tip form may be used. Alternatively, however, the rollers could also have profilings.

It was shown, surprisingly, that a device with two or more pairs of rollers used in succession, in which the pairs of rollers have in each case different toothings, affords good softening results. For example, the deforming unit may contain a first pair of rollers with $z=14$ and a second pair of rollers with $z=40$. Consequently, the universality of the method can be extended for a broad spectrum of types of fabric. A configuration with multiple pairs of rollers of this type could also be advantageous for devices having other drive solutions. Separate and activatable drives would not necessarily have to be provided in this case.

The toothing of the rollers of a pair of rollers may be configured, at least in a normal operating phase, so as to engage one in the other in such a way that the penetration depth t amounts to about 0.1 to 0.6 of the tooth depth.

It was shown, surprisingly, that especially good softening results can be achieved when the rollers are chromium-plated or hardened in the region of the toothing in order to avoid abrasion.

A further aspect of the invention relates to a method for treating continuously conveyed material, preferably using the device described above. The material is led between two cooperating rollers, the material, when led through, being deformed by the mechanical action of the teeth. The rotary drives of the rollers are controlled via an advantageously central control apparatus for the purpose of maintaining operation which is synchronous in terms of angular speed and roller position.

It may be advantageous if the rotational speeds of the profiled or toothed rollers is selected such that the circumferential speeds of the rollers are higher than the material speed in the region of the toothing (lead). In this type of operation, excess material which has been applied to the threads by impregnation can be removed again especially simply or influence upon the softening process can be increased.

To bring about a lead or a lag, a relative movement between the material speed and the rotational speed of the rollers can be set.

The material can be led through at least two deforming units with pairs of rollers, the at least two pairs of rollers having in each case different toothings. The rotary drives of the respective pairs of rollers can be controlled in such a way that, in the case of different pairs of rollers, different rotational speeds are obtained in the region of the toothings. The two deforming units can be controlled with relative individual movement (lead). Each unit can thus have or generate its own lead. Thus, depending on the type of fabric, the degree of softening can be further adapted.

Figure 2:
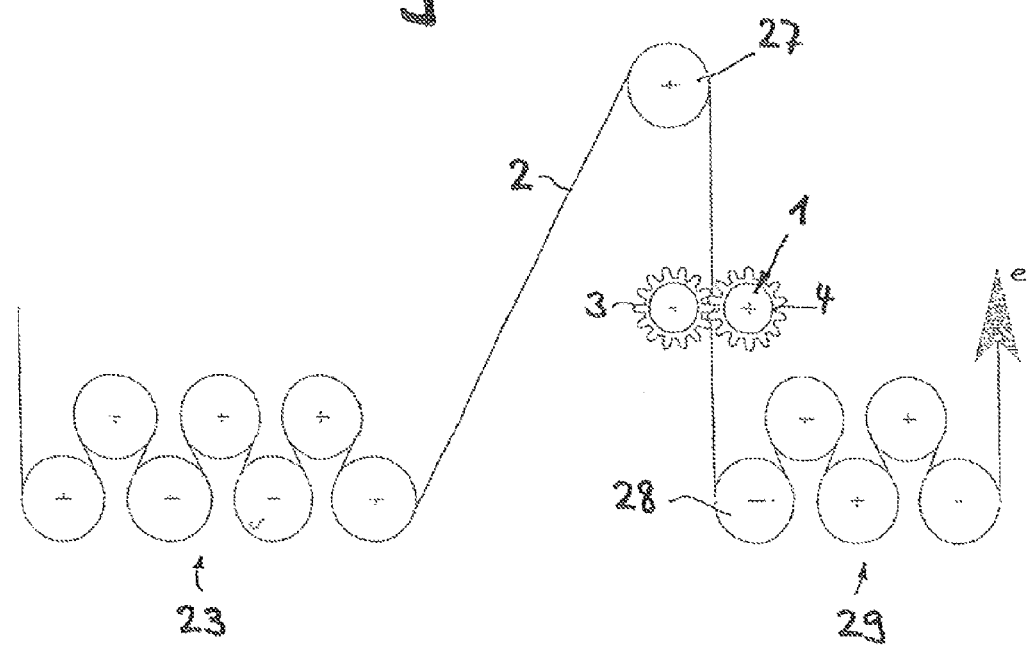
Figure 7:
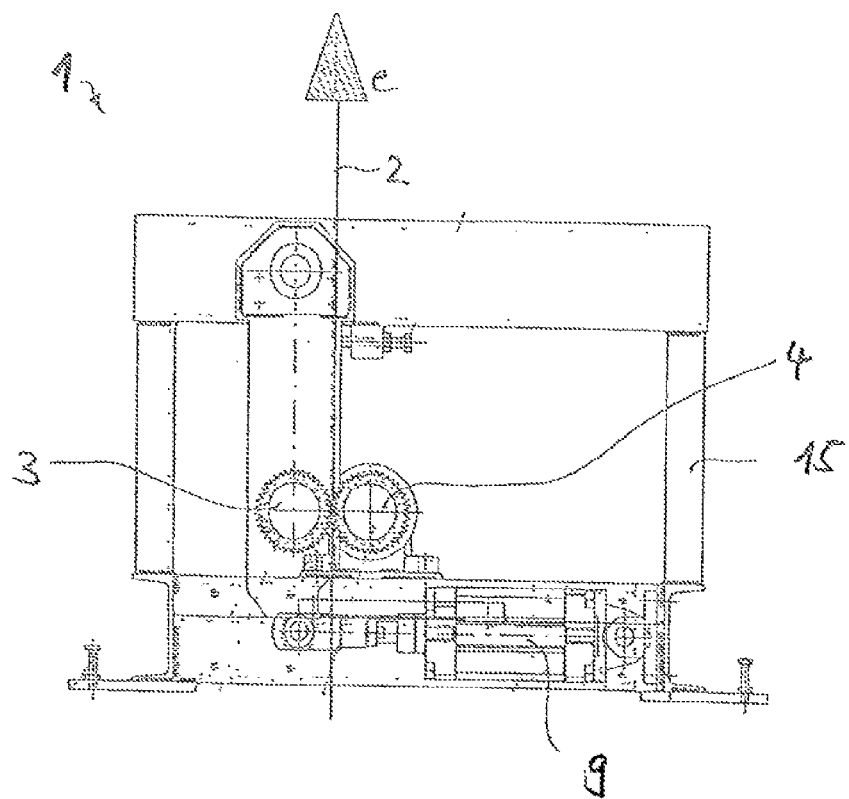
Figure 8:
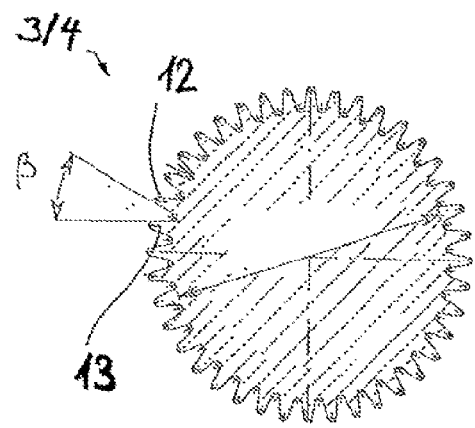

Further individual features and advantages of the invention may be gathered from the following description of exemplary embodiments and from the drawings in which:

FIG. 1 shows a diagrammatic illustration of a plant with units for the deformation of material according to the prior art, FIG. 2 shows a simplified illustration of a plant with a unit according to the invention for the deformation of material, FIG. 3 shows an enlarged illustration of the unit from FIG. 2, FIG. 4 shows a greatly enlarged illustration of the deformation region of the deforming unit (detail D from FIG. 1), FIG. 5 shows a front view of a device with a deforming unit, FIG. 6 shows the device according to FIG. 5 in cross section, FIG. 7 shows the device according to a further exemplary embodiment, and FIG. 8 shows a cross section through a roller of the device according to FIG. 7 in an enlarged illustration.

FIG. 1 shows a plant of conventional type of construction which has two units for the deformation of material 2. The plant contains two traction mechanisms 23 and 29 and also two measuring rollers 27 and 28. The deforming unit, designated by 20, has two elements 21, 22 which have knife edges, past which the material 2 is led and is at the same time bent. The second deforming unit, designated by 20', is likewise in an active position. To bring about an inactive position, the deforming unit 20, 20' can be pivoted, for example, by means of a lever mechanism (not illustrated). The pivoting movement is indicated by corresponding arrows. The knife edges cause a comparatively high braking effect on account of the friction. A deflecting roller 24 is located between the two units. The basic set-up according to FIG. 1 is implemented, for example, in the "Softener Paraflex" machines of the applicant.

FIG. 2 shows, according to the invention, a plant in which material 2 is transported continuously in the e-direction and in which it passes for deformation (softening) purposes the unit 1, explained in more detail below, having contra-directionally rotating rollers 3, 4. The plant contains a traction mechanism 23, 29 in each case upstream and downstream of the deforming unit. By means of the measuring rollers 27 and 28, the pulls of the material can be measured and set. As we can gather from FIG. 2, said measuring rollers 27 and 28 deflect the material in such a way that it is led up to and away from the deforming unit 2 vertically in an approximately straight line. The speed of the material or the pulls upstream and downstream of the unit can be controlled and set by means of digital drives of the traction mechanisms.

FIG. 3 shows the two contra-directionally rotating rollers 3 and 4 provided with toothings. Material 2 conveyed in the e-direction is led through between the rollers 3, 4. The rollers 3 and 4 are in this case connected operatively to one another in such a way that the material 2 received between them is deformed by the mechanical action of the toothings and deformed out of the transport direction e or treated in the transport direction by looping. The deforming unit designated by 1 is an integral part of a device for the treatment of sheet-like structures. An especially preferred area of application is in this case the production of tire cord. A corresponding device has an impregnating compartment and a following drying compartment. The present deforming unit can be installed in the device so as to follow the drying compartment (not illustrated here) with respect to the transport direction of the material. The present deforming unit, because of its compact construction size, is also suitable for installation in already existing plants. The two rollers 3 and 4 are configured identically in terms of dimensioning and toothing.

FIG. 4 shows an enlarged detail of the meshing of the pair of gearwheels from FIG. 1. As will be gathered from FIG. 3 and particularly from the illustration of the detail according to FIG. 4, the individual teeth clearly engage one in the other in a similar way to a toothed gear, but without this intermeshing leading to contact between the teeth. In order to avoid damage to the material 2, a sufficient gap distance between the toothings must be provided at least in a normal operating phase. In FIG. 4, a first gap distance between the gearwheel flanks of the teeth 11 and 12 is designated by A and a second gap distance between the flanks of the teeth 11 and 13 is designated by B. The penetration depth of the tooth 11 into the opposite root region between the adjacent teeth 12 and 13 is designated by t and the tooth depth is designated by h.

The tip circle line is indicated in FIG. 4 by a dashed line. The tooth 11, in the position according to FIG. 2, is located exactly centrally between the teeth 12 and 13. In this position, the maximum penetration depth t of the teeth is obtained. The rollers 3, 4 have an involute toothing.

Furthermore, it may be advantageous if at least one of the rollers is arranged movably in such a way that unevennesses or thickenings in the material which suddenly occur can be compensated, without a break of the material or damage to the latter occurring. The corresponding displacement direction is indicated in FIG. 3 by the arrow a.

For optimal operation, the rollers 3 and 4 must rotate synchronously and the gaps A, B must be controlled, the gap widths preferably being identical. For this purpose, the respective rotary drives for driving the individual rollers 3, 4 are connected electronically to a digital control apparatus 8. The control apparatus 8 transmits control signals to the rotary drives, so that the rollers rotate at an identical angular speed ($\omega 1 = \omega 2$) and the respective positions of the rollers remain the same (condition A=B). The speeds v1, v2 in the circumferential region of the toothing are consequently likewise identical. F1 and F2 indicate tensile forces upon the material which act in the e-direction or in the opposite direction. By means of a sensor 14, the speed v3 of the material can be measured. The rotary drives 5, 6, configured, for example, as AC servomotors, are controlled by rotary encoders, in particular digital encoders with very high angular resolution. In order to avoid gear play in the regulating system, the digital encoders are preferably fastened directly to the rollers.

Alternatively or additionally to controlling via the rotary encoders of the rotary drives for the rollers, an automatic control may also be provided. 17 and 18 indicate sensors, with the aid of which the angular speed and the angular position of the rollers can be measured. These sensors 17, 18 can be connected to the control apparatus 8 via signal lines and, together with the rotary encoders, form in each case one or a common control loop circuit. For the automatic control, the control apparatus may have integrated in it a comparator which in a way known per se compares the measured actual values for the speeds or numbers of revolutions with desired values, and, on the basis of the comparison, the control apparatus 8 acts upon the rotary drives in a correcting manner for regulating purposes. In a similar way, the positions or angular positions of the rollers must be detected, compared with one another and corrected or regulated. The rotary drives and, if appropriate, the material sensor 14 and also, possibly further, the sensors 17 and 18 for detecting the angular speed and/or rotary speeds on the roller circumference and the angular position of the rollers may be linked to one another via a bus system. Any different rotational speeds of the rollers 3 and 4 can be corrected via a control loop circuit.

In many instances, it is advantageous if the transport speed of the material and the rotational speed of the rollers are identical. If, however, the toothed rollers 3 and 4 run at a higher speed than the conveying speed (that is to say, v1, v2>v3), the thread pull can be increased and the softening effect intensified. Particularly in the area of application of tire cord production, excess impregnating material on the polyester threads can be removed especially simply or the warp can be softened even further. However, in specific areas or instances of application, it may be also advantageous if the rollers run more slowly than the material.

As a result of movement of, for example, the roller 3 in the direction of the arrow a, in the case of rotationally synchronous operation, the distance C between the pair of rollers can increase (or reduce) the gap widths A, B in the same direction and thus adapt them to different material. By the gap widths being varied, furthermore, the degree of looping of the material acted upon by the teeth can be set and consequently the intensity of the softening effect can be influenced.

FIGS. 5 and 6 show structural details of a deforming unit 1 according to the invention. As can be gathered from FIG. 3, the toothing of the roller 3 extends over the entire roller width W which defines the maximum cloth width of the conveyed material. Furthermore, electric motors 5, 6 as rotary drives for the rollers can be seen in FIG. 5. The AC electric motor, designated by 5, with a digital rotary encoder or pulse generator is arranged coaxially to the roller 3 and is connected directly to the latter. Direct connection takes place via a rigid coupling 16. Of the second roller, only an end-face connection piece, designated by 4', can be seen in FIG. 5. The connection piece 4' of the roller is coupled to a gear 7 which makes the geared connection with the electric motor 6. It may be especially advantageous in control and regulating terms if the rotary drive is designed as a servomotor. The electric motors may be, for example, brushless direct current motors. The measured rotary or angular speeds (v1 or $\omega 1$, v2 or $\omega 2$) and positions can be regulated in a closed or possibly open control loop by the control apparatus which compares the measured actual value of the speed and angular position with a speed desired value or angular position desired value and, by means of a comparator unit of the control apparatus, transmits a correcting variable to the rotary encoders for regulating purposes. The rollers 3, 4 are in the form of a spur wheel with straight toothing.

FIG. 6 shows that the material is led along a vertical transport path, straight in the side view, up to the deforming unit 1 and finally away from the latter. The transport direction e runs upward. However, other orientations or directions may, of course, also be considered. FIG. 6 shows a pneumatic piston/cylinder unit 9, by means of which the roller can be moved back and forth in the a-direction. The pneumatic piston/cylinder unit 9 is connected in an articulated manner to a supporting element 26, on which the roller 4 is mounted rotatably. The supporting element is connected at the upper end to the stationary carrier 15 via a center of rotation. As a result of the relatively large lever, advantageous displacement of the roller 4 in the a-direction is ensured. The rollers have in each case 14 teeth and may have, for example, a tip circle diameter of 128 mm and a root circle diameter of approximately 93 mm.

FIG. 7 shows a further variant of a deforming or softening unit 1 according to the invention. This deforming or softening unit differs from that according to the previous exemplary embodiment essentially only in that rollers having a different toothing are used. In this exemplary embodiment, the rollers 3 and 4 are provided in each case with 40 teeth. Structural details regarding the toothing may be gathered from the following FIG. 8 which shows, true to scale, a cross section of the rollers 30 and 40.

As may be gathered from FIG. 8, the individual teeth 12, 13 have flank lines running approximately straight. The tooth tips and tooth roots between the respective tooth flanks are of approximately circular configuration (radius, for example, between 1 and 3 mm). A flank angle between the adjacent teeth 12 and 13 is designated by β and amounts in the present exemplary embodiment to 29°.

The invention claimed is:

1. A device for treating continuously conveyed material, comprising at least one unit for deforming the material,
    said at least one unit containing a pair of rollers, each roller of said pair of rollers being provided, in each case, with an exterior profiling designed to deform the material by a mechanical action of the profiling,
    each roller of said pair of rollers being operatively connected to one another in such a way that, when said material is feed through between said pair of rollers, the material being deformed by the mechanical action of the profiling of the pair of roller;
    wherein each roller of said pair of rollers is driven separately,
    and each roller of said pair of rollers is assigned a rotary drive,
    said rotary drives of each roller of said pair of rollers separately controllable by control means,
    said control means have a controller for regulating an angular position and/or angular speed ($\omega 1, \omega 2$) of each roller of said pair of rollers;
    the pair of rollers each comprise a toothed roller and including sensors which detect gap widths (A, B) occurring between respective flank portions of the pair of toothed rollers,
    said sensors are operatively connected to the control means,
    said rotary drives are controlled separately by said control means such that the gap widths (A, B) are equated to one another; and
    additionally, a second deforming unit with a pair of rollers and third deforming unit with a knife edge, and
    said knife edge runs transversely to a direction of the material.

2. The device as claimed in claim 1, wherein said rotary drive is, in each case, connected to its respective roller directly or via a pretensioned gear.

3. The device as claimed in claim 2, wherein said rotary drives are connected to a central control apparatus via serial interfaces.

4. The device as claimed in claim 1, wherein said rotary drive has in each case an electric motor, said electric motor being controllable via a digital drive device.

5. The device as claimed in claim 1, wherein each of said rollers of said pair of rollers is provided with a rotary encoder, and said control means are connected electronically to the rotary encoders.

6. The device as claimed in the claim 1, wherein said rotary drives are assigned in each case to a separate control loop circuit.

7. The device as claimed in claim 1, comprising a sensor wherein said sensor precedes or follows the pair of rollers,
    said sensor is connected electronically to the control means for controlling the pair of rollers wherein said sensor is detecting the speed ($\omega$) of the material.

8. The device as claimed in claim 1, comprising hydraulic or pneumatic displacement means for shortening or lengthening the distance (A) between axes of rotation of each roller of said pair of rollers.

9. The device as claimed in claim 1, wherein one roller of said pair of rollers is mounted fixedly with respect to its axis of rotation on a stationary carrier, and when the other roller of the pair of rollers is movably mounted on the stationary carrier for adjusting the position and/or for shortening or lengthening the distance (A).

10. The device as claimed in claim 8, wherein said displacement devices can be activated via control means for varying the wrap angle.

11. The device as claimed in claim 1, wherein said rollers of said pair of rollers are configured as a spur wheel with straight toothing or helical toothing.

12. The device as claimed in claim 1, wherein said rollers of said pair of rollers have an involute or cycloidal toothing.

13. The device as claimed in claim 1, wherein said toothings of said rollers of a pair of rollers are configured, at least in a normal operating phase, so as to engage one in the other in such a way that a penetration depth (t) amounts to about 0.1 to 0.6 of a tooth depth (h).

14. The device as claimed in claim 1, wherein said rollers of said pair of rollers are chromium plated or hardened in a region of the toothing.

15. The device as claimed in claim 1, comprising at least two deforming units with pairs of rollers, wherein said at least two pairs of rollers have in each case different toothings.

* * * * *